(No Model.)

J. D. RIPSON.
COFFIN LID.

No. 387,921. Patented Aug. 14, 1888.

Witnesses.
J. Edw. Mayben.
J. M. Jackson.

Inventor.
J. D. Ripson.
Donald C. Ridout & Co.
Atty.

UNITED STATES PATENT OFFICE.

JOHN D. RIPSON, OF TORONTO, ONTARIO, CANADA, ASSIGNOR TO EDWARD GEORGE KELLY, OF SAME PLACE.

COFFIN-LID.

SPECIFICATION forming part of Letters Patent No. 387,921, dated August 14, 1888.

Application filed December 24, 1887. Serial No. 258,897. (No model.)

*To all whom it may concern:*

Be it known that I, JOHN DANFORD RIPSON, of the city of Toronto, in the county of York, in the Province of Ontario, Canada, have invented a certain new and useful Improvement in Coffin-Lids, of which the following is a specification.

The object of the invention is to so arrange the spring glass-stop in connection with a lug attached to the lid or panel that the said glass-stop shall be automatically operated by the adjustment of the lid or panel, the glass being left free to slide without impediment when the lid or panel is removed, or securely locked and prevented from sliding when the lid or panel is fastened in position; and it consists, essentially, in forming the glass-stop in such a manner that when it is not pressed upon its spring will hold it clear of the glass, and attaching to the lid or panel a lug arranged to push the glass-stop behind the edge of the glass when the lid or panel is fastened in position, substantially as hereinafter more particularly explained.

Figure 1:
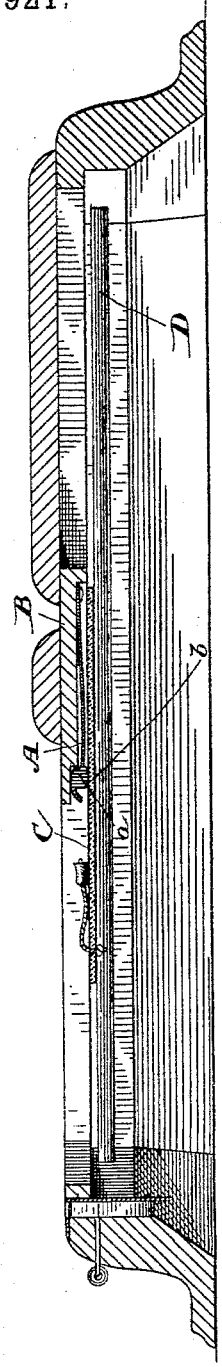
Figure 2:
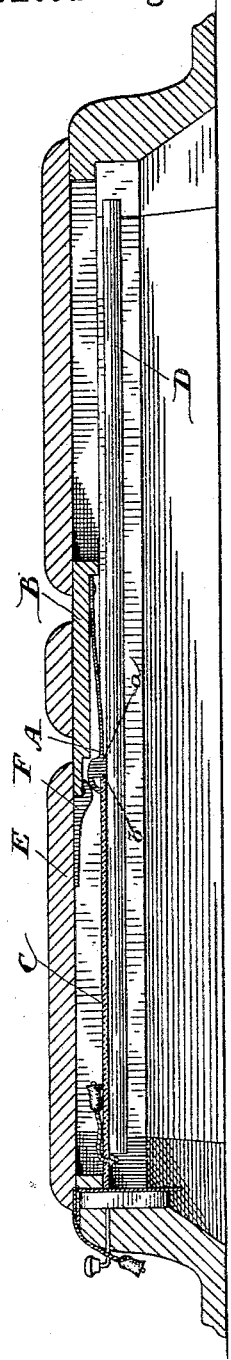

Figure 1 is a longitudinal section of a casket-cover, showing the position of the glass-stop when the lid or panel is removed. Fig. 2 is a longitudinal section of a casket-cover, showing the position of the glass-stop when the lid or panel is fastened in position.

In the drawings, A is the glass-stop attached to the bottom side of the casket-cover B.

C is the glass arranged to slide upon a guide or molding, D, one of which is located on either side of the glass.

$a$ is a lip or projection formed on the end of the glass-stop A, forming a shoulder, $b$, on the glass stop A, to project behind the edge of the glass C when the stop A is pressed down, as indicated in Fig. 2. When not so pressed down, the natural spring of the stop A holds it above and clear of the glass C, as indicated in Fig. 1, leaving the glass free to slide without impediment on its guides D. On the bottom of the lid or panel E, I attach a lug, F, in such a position that when the lid or panel E is over the glass, as indicated in Fig. 2, the said lug F will press down upon the spring glass-stop A, so as to push the shoulder $b$ behind the back edge of the glass C, thereby locking the glass and preventing it being moved upon its guides. It will thus be seen that when the lid or panel E is removed the glass C will slide without impediment; but the moment the lid or panel E is placed in position the glass is instantly locked.

What I claim as my invention is—

The combination, with a spring glass-stop, of a lug connected to the bottom of the lid or panel in such a position that it will come in contact with and press the glass-stop behind the edge of the glass when the lid or panel is adjusted in position, substantially as and for the purpose specified.

Toronto, December 14, 1887.

JOHN D. RIPSON.

In presence of—
CHARLES C. BALDWIN,
C. H. RICHES.